United States Patent
Sun et al.

(10) Patent No.: US 6,785,080 B1
(45) Date of Patent: Aug. 31, 2004

(54) METHOD AND APPARATUS FOR PROVIDING A VARIABLE RATE OVERSAMPLING DIGITAL FILTER FOR RESONANCE COMPENSATION IN DISK DRIVE SERVO CONTROL SYSTEMS

(75) Inventors: Yu Sun, Fremont, CA (US); Don Brunnett, Pleasanton, CA (US); XiaoPing Hu, Fremont, CA (US)

(73) Assignee: Maxtor Corporation, Longmont, CO (US)

( * ) Notice: Subject to any disclaimer, the term of this patent is extended or adjusted under 35 U.S.C. 154(b) by 245 days.

(21) Appl. No.: 09/974,454

(22) Filed: Oct. 9, 2001

Related U.S. Application Data (60) Provisional application No. 60/239,157, filed on Oct. 10, 2000.

(51) Int. Cl.[7] .............................................. G11B 21/02
(52) U.S. Cl. ........................................................ 360/75
(58) Field of Search ................................ 360/75, 77.02, 360/77.08, 77, 78.09, 65; 370/210; 704/205; 708/313, 320; 375/319, 344

(56) References Cited

U.S. PATENT DOCUMENTS

| | | | | |
|---|---|---|---|---|
| 4,359,608 A | * | 11/1982 | Watson et al. ............... 704/205 |
| 4,398,228 A | | 8/1983 | Bauck ........................... 360/77 |
| 4,785,447 A | * | 11/1988 | Ichiyoshi ...................... 370/210 |
| 5,111,417 A | * | 5/1992 | Belloc et al. ................. 708/313 |
| 5,157,623 A | * | 10/1992 | Hayashi ........................ 708/320 |
| 5,325,247 A | | 6/1994 | Ehrlich et al. ............. 360/78.09 |
| 5,325,318 A | * | 6/1994 | Harris et al. ................. 708/313 |
| 5,367,513 A | * | 11/1994 | Bates et al. ................. 369/44.29 |
| 5,381,359 A | * | 1/1995 | Abbott et al. ................ 708/322 |
| 5,504,785 A | * | 4/1996 | Becker et al. ............... 375/344 |
| 5,612,975 A | * | 3/1997 | Becker et al. ............... 375/319 |
| 5,774,298 A | | 6/1998 | Cheung et al. ........... 360/77.08 |
| 5,818,659 A | | 10/1998 | Cheung et al. ........... 360/77.08 |
| 5,907,299 A | * | 5/1999 | Green et al. ................. 341/143 |
| 6,122,125 A | | 9/2000 | Clare et al. ................... 360/65 |
| 6,188,191 B1 | | 2/2001 | Frees et al. .................. 318/560 |
| 6,219,196 B1 | | 4/2001 | Semba et al. ................. 360/75 |
| 6,417,982 B1 | * | 7/2002 | Ottesen et al. ........... 360/77.02 |
| 6,574,065 B1 | * | 6/2003 | Sri-Jayantha et al. ......... 360/75 |

\* cited by examiner

*Primary Examiner*—David Hudspeth
*Assistant Examiner*—Fred F. Tzeng
(74) *Attorney, Agent, or Firm*—Tejpal S. Hansra (57) ABSTRACT

A method and apparatus for controlling the position of a disk drive transducer head relative to a target track are provided. An oversampled control output allows frequencies that are higher than the Nyquist frequency of the servo control system to be filtered. The system initiates a plurality of control outputs during a single sampling period, allowing the use of a single processor interrupt for each sampling period. The outputs initiated during a single sampling period may be of unequal length. In addition, the outputs may be proportioned so that the total control energy provided to the actuator is equal to the control energy that would be provided by control outputs initiated every one-half sampling period.

45 Claims, 7 Drawing Sheets

METHOD AND APPARATUS FOR PROVIDING A VARIABLE RATE OVERSAMPLING DIGITAL FILTER FOR RESONANCE COMPENSATION IN DISK DRIVE SERVO CONTROL SYSTEMS

CROSS REFERENCE TO RELATED APPLICATIONS

Priority is claimed from U.S. Provisional Patent Application Serial No. 60/239,157, filed Oct. 10, 2000, entitled "VARIABLE RATE OVERSAMPLING DIGITAL NOTCH FILTER FOR RESONANCE COMPENSATION IN DISK DRIVE SERVO CONTROL SYSTEM", the disclosure of which is incorporated herein by reference in its entirety.

FIELD OF THE INVENTION

The present invention relates to the filtering of control information in a disk drive servo control system. In particular, the present invention relates to a providing an oversampled digital filter for resonance compensation in connection with disk drive servo control systems.

BACKGROUND OF THE INVENTION

Computer disk drives store information on magnetic disks. Typically, the information is stored on each disk in concentric tracks that are divided into servo sectors and data sectors. Information is written to or read from a disk by a transducer head, mounted on an actuator arm. The actuator arm is capable of moving to position the transducer head radially over the disk. Accordingly, the movement of the actuator arm allows the transducer head to access different tracks. The disk is rotated by a spindle motor at a high speed, allowing the transducer head to access different sectors within each track on the disk.

The actuator arm is interconnected to an actuator, such as a voice coil motor (VCM) to move the actuator arm such that the transducer head can access different tracks. Operation of the actuator is controlled by a servo control system. The servo control system generally performs two distinct functions: seek control and track following. In general, the seek function is initiated when a host computer associated with the disk drive issues a command to read data from or write data to a target track on a disk. Once the transducer head has been moved sufficiently close to the target track by the seek function of the control system, the track following function of the control system is activated to center and maintain the transducer head on the target track until the desired data transfers are completed.

Typically, the transducer head will oscillate about the center line of the target track for a period of time following the transition of the servo control system from the seek mode to the track following mode. In addition, while in the track following mode, adjustments to the position of the transducer head with respect to the center line of the target track are often required. Such small adjustments are required to correct drift in the position of the transducer head relative to the target track. The precise control of the position of the transducer head relative to a target track has become increasingly important as data densities in disk drives have increased.

In a typical disk drive, a digital signal processor or microprocessor is used to implement the servo control system. The digital control output of the digital signal processor or microprocessor is converted to an analog control signal and applied to the actuator (e.g., the voice coil motor) to position the transducer head relative to the target track. The processor used to implement the servo control system is often used to also implement the read/write channel of the disk drive to reduce the cost of the disk drive. Therefore, as more processing resources are devoted to implementing the servo control system, fewer of those resources are available for read and write operations, reducing the performance of the disk drive.

The mechanical actuator assembly, including the actuator, the actuator arm, and the transducer head, has flexible resonance modes. The phase and amplitude of the flexible resonance modes are difficult to control in mechanical manufacturing processes. Therefore, notch filters have been applied around the resonant frequencies to attenuate excitation of the actuator assemblies at those frequencies. However, the resonant frequencies may be greater than the Nyquist frequency of the servo control system.

The Nyquist frequency is defined as one-half the sampling frequency of a digital system. Signals having frequencies above the Nyquist frequency result in aliasing. Aliasing causes higher frequency signals present in the system to be reflected back to a frequency below the Nyquist frequency. With respect to a servo control system, the number of servo sectors containing positioning information used to correct the position of the transducer head during track following operations, the rate of rotation of the magnetic disks, and the speed and computational power of the microprocessor or digital signal process used to implement the read/write channel and the servo control system of the disk drive, determine the sampling rate of the servo control system. In general, the number of servo sectors utilized in a disk drive, and therefore the sampling frequency of the servo control systems, is limited, because portions of the disk devoted to servo sectors reduces the area of the disk available for user data, while the computational power of the processor is limited due to cost considerations.

One approach that has been proposed to remove unwanted signals at frequencies greater than the Nyquist frequency of the system is to apply a notch filter about the frequency at which the higher frequency signal is mirrored due to aliasing. However, the placement of a notch filter in the vicinity of the cross-over frequency of the closed loop servo control system results in high phase losses. As a result, the control system can become unstable, resulting in poor tracking of the target track by the transducer head.

Another approach to filtering frequencies from the control signal that can cause undesirable resonance in the actuator assembly is to apply a symmetrical, double sampling rate notch filter to the system. According to this approach, for each instance of position information acquired from the servo sectors, the digital notch filter provides two position control outputs. The output from the digital notch filter is applied symmetrically in that the additional control signal is equally spaced between the preceding and succeeding first control signals generated in response to each set of position information. Although such systems are effective in filtering high frequencies, a relatively large proportion of digital signal processor or microprocessor resources are required. In particular, because of the symmetrical spacing of the oversampled control outputs, processing overhead is increased because two interrupts must be generated for each sampling period in order to produce the oversampled control output. Accordingly, the overall performance of the disk drive is degraded, as relatively fewer resources in the digital signal processor or microprocessor are available for other functions, such as read and write operations.

It would be advantageous to provide a disk drive that is capable of providing an oversampled disk drive servo control system filter that did not require a large amount of processor overhead to implement. Furthermore, it would be advantageous to provide a disk drive having a servo control system that was capable of providing an oversampled control output to an actuator that did not require the execution of more than one interrupt service routine during a sampling period. Furthermore, it would be advantageous to provide a disk drive servo control system that provided an oversampled control output, that had low processor overhead requirements, that was inexpensive to implement, and that was reliable in operation.

SUMMARY OF THE INVENTION

In accordance with the present invention, a method and an apparatus for providing a variable rate oversampling digital filter for resonance compensation in disk drive servo control systems are provided. The present invention generally allows frequencies corresponding to resonance modes in actuator arm assemblies of a disk drive to be filtered, even though those frequencies are in excess of the Nyquist frequency of the servo control system. In addition, such filtering is achieved with relatively little digital signal processor or microprocessor overhead.

In accordance with an embodiment of the present invention, position information received from a servo sector is applied to a proportional-integral-derivative (PID) controller and the output of the PID controller is then applied to an oversampling digital filter. The oversampling digital filter provides a plurality of filtered outputs that can be applied to control of the actuator. Furthermore, the period of time over which a first filtered control output based on a first set of position data is applied to the actuator is not equal to the period of time over which a second filtered control output based on the first set of position information is applied to the actuator. This asymmetrical application of the first and second control outputs allows generation of the control output signals to be calculated during the same interrupt service routine. Accordingly, two outputs may be provided for each set of position data, without requiring the digital signal processor to service two interrupts during a sampling period.

According to another embodiment of the present invention, a first filtered control output, is determined during a first interrupt service routine using position data received from a first servo sector. The first filtered control output is provided to an amplifier during the interrupt service routine. A second filtered control output is then initiated during the same interrupt service routine, the second filtered output having been determined by the same input signal as the first one received. The period over which the first and second filtered control outputs are provided to the actuator are unequal.

According to still another embodiment of the present invention, at least one filtered control output initiated during each sampling period of the servo control system is proportioned. The control output may be proportioned so that the asymmetric control outputs initiated during a single interrupt service routine according to the present invention provide an amount of control energy that is equal to the amount of control energy that would be provided to the actuator by a symmetric oversampling control system. According to such an embodiment of the present invention, the proportioning of at least one of the asymmetric control outputs allows the control system to provide desirable frequency and phase response characteristics, while reducing digital signal processor overhead by allowing all control outputs initiated during a single sampling period to be initiated using a single interrupt service routine.

According to an embodiment of the present invention, the servo control system of the present invention incorporates a proportional-integral-derivative (PID) controller. The output of the PID controller is provided to an oversampling, asymmetric filter. In accordance with an embodiment of the present invention, the output from the PID controller is provided to the filter at twice the rate at which position data is received from the servo sectors (i.e. at twice the sampling rate). According to another embodiment of the present invention, the controller provides position data to the filter at a rate equal to the sampling rate, and the filter calculates two outputs for each set of position information received from the controller. The servo control system may additionally include an amplifier. The output from the filter to the amplifier may be in the form of an analog signal, or in the form of a digital signal that the amplifier converts to an analog signal. An analog control signal is then provided to the actuator. In general, the servo control system may include a sample and hold circuit, to provide the commanded output level until a next filtered output is received. The filter may be in the form of digital impulse response filter, and may act as a low pass or a notch filter.

Additional advantages of the present invention will become readily apparent from the following discussion, particularly when taken together with the accompanying drawings.

DETAILED DESCRIPTION

Figure 1:
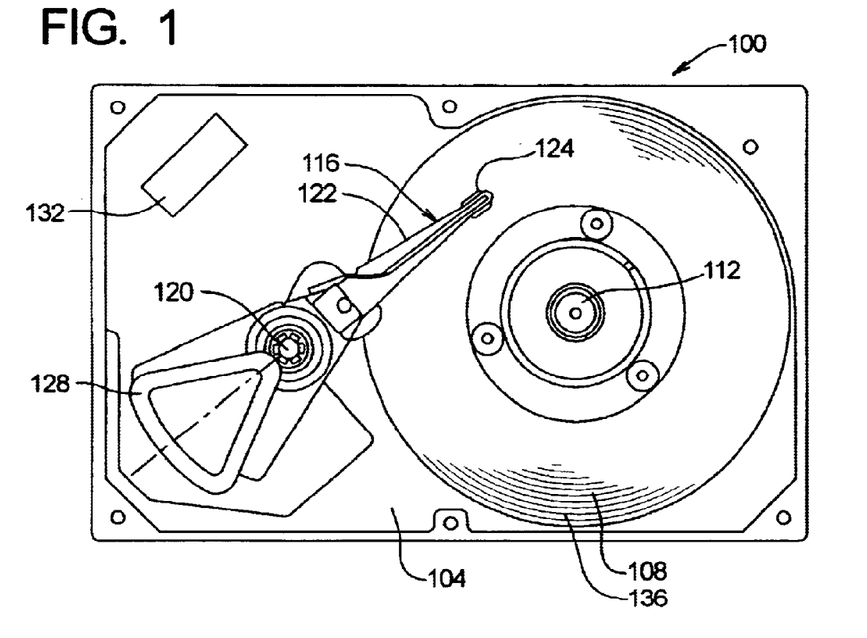
FIG. 1 is a diagrammatic representation of a top view of a conventional computer disk drive, with the cover removed.

FIG. 1 illustrates a typical computer disk drive 100. The disk drive 100 generally includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 include actuator arms 122 (only one of which is shown in FIG. 1), and transducer heads 124 (only one of which is illustrated in FIG. 1) at a first end of the actuator arms, to address each of the surfaces of the magnetic disks 108. An actuator 128, such as a voice coil motor, located at the second ends of the actuator arms, pivots the actuator arm assemblies 116 about the bearing 120 in response to control signals received from a disk drive controller 132 to radially position the transducer heads 124 with respect to the magnetic disks 108. By changing the radial position of the transducer heads 124 with respect to the magnetic disks 108, the transducer heads 124 can access different data tracks or cylinders 136 on the magnetic disks 108. The disk drive controller 132 may be implemented by a programmable processor, including a digital signal processor (DSP).

Figure 2:
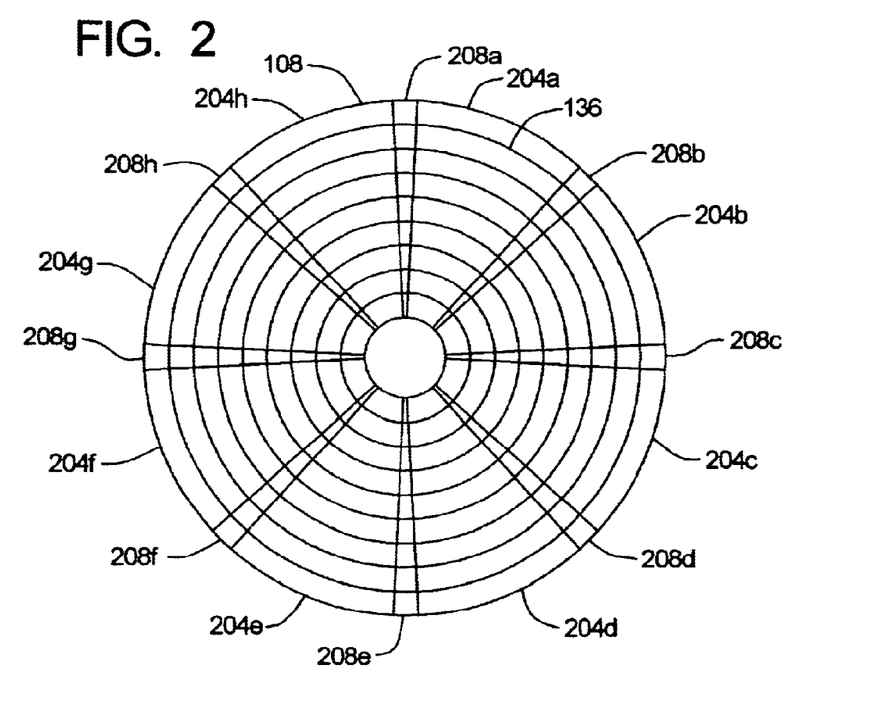
FIG. 2 is a diagrammatic representation of a top view of a magnetic storage disk.

With reference now to FIG. 2, a typical arrangement of data tracks 136 on a magnetic disk 108 is illustrated. Usually, the data tracks 136 are divided into data fields 204a–204h with one or more data fields between servo sectors 208. Generally, the data fields 204a–204h are used for storing data as a series of magnetic transitions, while the servo sectors 208a–208h are used for storing information and servo sector position bursts used to provide the transducer head 124 with positioning and channel control information, also as a series of magnetic transitions.

Although the magnetic disk 108 shown in FIGS. 1 and 2 is illustrated as having a relatively small number of tracks 136 and servo sectors 208, it can be appreciated that a typical computer disk drive contains a very large number of such tracks and sectors. For example, computer disk drives having over 30,000 tracks per inch and 120 servo sectors in a track are presently available. In addition, alternate configurations of magnetic disks 108 are possible. For example, in a computer disk drive having several magnetic disks 108, a surface of one of the disks 108 may be dedicated to servo information, while the surfaces of the remaining disks 108 may be used exclusively to store data.

The transducer head 124 operates by sensing the magnetic flux transitions encoded in the disk 108 by a write operation. In order to sense the magnetic transitions, the transducer head 124 is held in close proximity to the track 136 containing the desired information. The disk 108 is rotated under the head 124, and the flux transitions are read by the head 124. As can be appreciated, during read operations, it is important to maintain the transducer head 124 over the desired portion of the track 136, such as the center line, to maximize the signal produced in the transducer head 124 by the passage of magnetic transitions written to the track 136.

Similarly, during write operations, it is important to maintain the position of the transducer head over the desired portion of the track 136, such as the center line. If the position of the transducer head 124 with respect to the track 136 is allowed to deviate from the desired position, there is a risk that data in adjacent tracks will be overwritten, or a risk that the data written to the track 136 will not be retrievable during future read operations, because the data will not be in the expected position.

Figure 3:
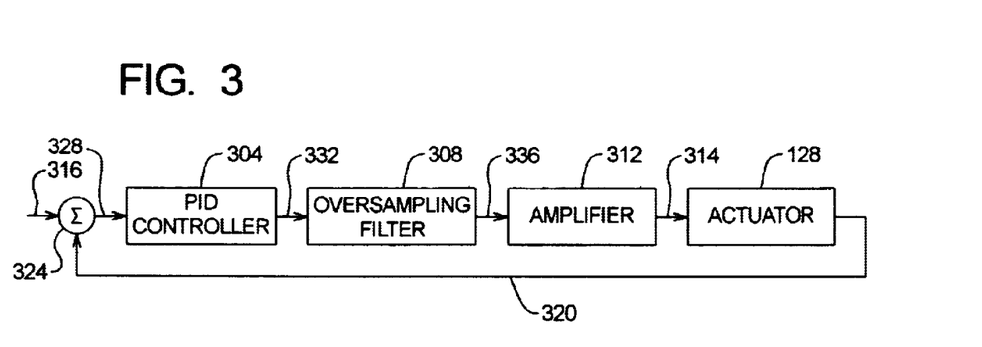
FIG. 3 is a block diagram of a servo control system in accordance with an embodiment of the present invention.

In order to maintain the transducer head 124 in the desired position relative to a target track 136, a servo control system 300 is utilized (see FIG. 3). According to the present invention, the servo control system 300 includes a controller 304, such as a proportional-integral-derivative (PID) controller 304 and an oversampling filter 308. The controller 304 and filter 308 are used to calculate the control commands that determine the output 314 of an amplifier 312. As can be appreciated by one of ordinary skill in the art, the controller 304 may alternatively include a proportional, proportional derivative, proportional integral, integral or derivative controller. The oversampling filter 308 is oversampling in that for each sampling period (i.e. for each update in position information received) at least two filtered outputs 336 are provided to the amplifier 312. As can be appreciated by one of ordinary skill in the art, the filter characteristics of the filter 308 are chosen to remove frequencies that may cause instability into servo control system 300, such as the resonant frequencies of the actuator arm assemblies 114. The control output 314 from the amplifier 312 is provided to the actuator 128 to maintain the transducer head 124 in the desired position with respect to the target track 136, or to move the transducer head to the target track 136.

In general, a position reference signal 316 which indicates the desired track center is received when the actuator arm assembly 116 is to move to allow the transducer head 124 to address a new target track 136. Typically, once the transducer head 124 is in relatively close proximity to the center line of the target track 136, a position error signal (PES) 328 is generated from servo sector position bursts contained in the servo sectors 208 associated with the target track 136. The PES 328 is equal to the difference between position signal 320 and position reference signal 316, as neither of them is directly measurable during track following. The PES 328 is then fed into the controller 304.

As will be understood by those of skill in the art, the "center line" of the data track 136 does not necessarily coincide with the physical center line of the data track 136. Instead, "center line" may refer to the center of the intended data storage area of the data track. Therefore, as used herein, "center line" of a data track need not refer to the physical center line of the data track 136, and "center" indicates that the transducer head 124 is properly centered over the area within the track 136 that is intended for data storage or retrieval, regardless of whether that position coincides with the physical center line of the data track 136.

Because the magnetic disks 108 rotate at a predetermined rate when the disk drive 100 is in operation, position error signals are periodically received by the controller 304. The periodic rate at which the position error signals 328 derived from servo sector position bursts stored in the servo sectors 208 are received defines the sampling rate of the servo control system 300. The time between consecutive position error signals defines the sampling period.

The PES 328 is received by the controller 304. In response to the PES 328, the controller 304 generates a digital control output 332 that is provided to the oversampling filter 308. The oversampling filter 308 is generally a digital, multiple order impulse response filter. The filter 308 may be implemented as a notch filter, in which a select band of frequency components are removed from a signal, or a low pass filter, in which all frequencies above a selected frequency are filtered from a signal. The filtered output 336 of the oversampling filter 308 is then provided to an amplifier 312. The amplifier 312 receives the filtered output 336, and outputs a control output 314 to operate the actuator 128. Therefore it can be appreciated that the control output 314 is an analog, variable power signal that is used to control the movement of the actuator 128 and thus the position of the transducer head 124 with respect to the target track 136.

According to one embodiment of the present invention, the filtered output 336 is proportioned to improve the performance of the servo control system 300, as will be explained in greater detail below. In accordance with a further embodiment of the present invention, the same filtered output 336 is provided to the amplifier 312 until an updated filtered output is generated by the filter 308. Accordingly, it can be appreciated that the filter 308, in combination with the amplifier 312, performs a sample and hold type function. In particular, the analog control output 314 may be maintained at a constant level, at least until the filtered output 336 is updated to command an analog control output having a different amplitude.

Figure 4:
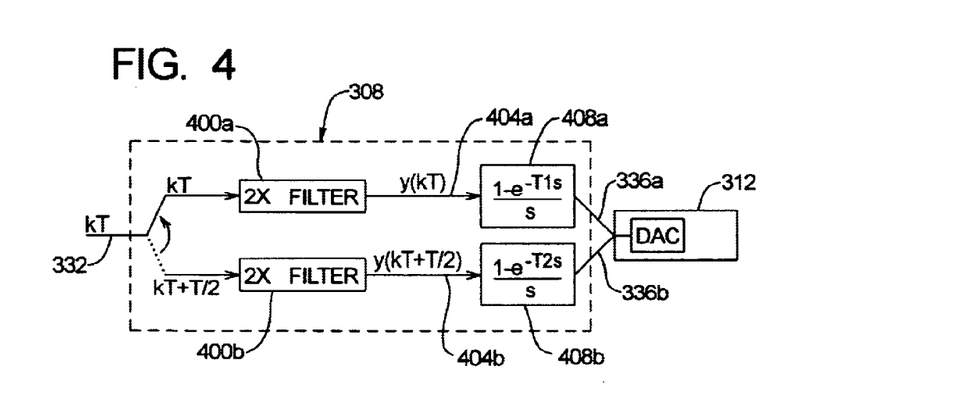
FIG. 4 is a variable rate filter control diagram in accordance with an embodiment of the present invention.

With reference now to FIG. 4, a variable rate oversampling filter 308 in accordance with an embodiment of the present invention is illustrated. In particular, FIG. 4 shows that a digital control output 332 is provided to the filter 308 by the controller 304 once per sampling period. In particular, the controller 308 provides an updated control output 332 for each new set of position error data 328. Because the updated position data corresponds to the start of a sample period, that data is provided at about time kT to the first filter algorithm 400a. The filter algorithm 400a calculates a first filter algorithm output y(kT) 404a that is provided to a first sample and hold block 408a. The first sample and hold block 408a outputs the first filtered output signal 336a to the amplifier 312 for a first period of time T1.

In addition, a second instance of the control output 332 is provided to the second filter algorithm 400b. In FIG. 4, the second filter algorithm block 400b, calculates a second filter algorithm output y(kT+T/2) 404b. Accordingly, the second instance of the control output 332 is considered by the filter algorithm 400b to correspond to a time equal to the sampling period with respect to which the control output 332 is generated plus one-half the sampling period. Because the filter algorithms 400 depend in part on the previous filter algorithm output 404, the second control output will generally differ from the first, even though for any one sampling period the control output 332 provided to the first filter algorithm 400a is the same as the control output 332 provided to the second filter algorithm 400b. The second filter algorithm output 404b is then provided to a second sample and hold block 408b, which provides the second filtered output signal 336b to the amplifier 312 for a second period of time, T2. In general, the filter 308 operates such that the first and second filtered outputs 336a and 336b are provided to the amplifier 312 consecutively. Furthermore, according to the present invention, the time periods T1 and T2 are not equal to one another, and T1+T2 is equal to the sampling period T. According to another embodiment of the present invention, the sum of T1 and T2 is about equal to T, with any difference due to delays in providing the filter output 336 to the amplifier 312.

The first filter algorithm 400a and the second filter algorithm 400b are illustrated as separate functional blocks in order to clarify the operation of an embodiment of the present invention. However, as can be appreciated by one of ordinary skill in the art, the first 400a and second 400b filter algorithms may be implemented by a single filter algorithm 400 that receives a first instance of the control output 332a at about time kT, and a second instance of the control output 332b at about time kT+T/2. Alternatively, the filter algorithm 400 may receive a single instance of the control output 332, and may calculate a first filter algorithm output 404a for time kT, and a second filter algorithm output 404b for time kT+T/2. Therefore, it can be appreciated that for every sampling period, at least two filter algorithm outputs are generated. Furthermore, it can be appreciated that the filter 308 is an oversampling filter because for each sampling period at least two filtered outputs 336a and 336b are generated.

Figure 5:
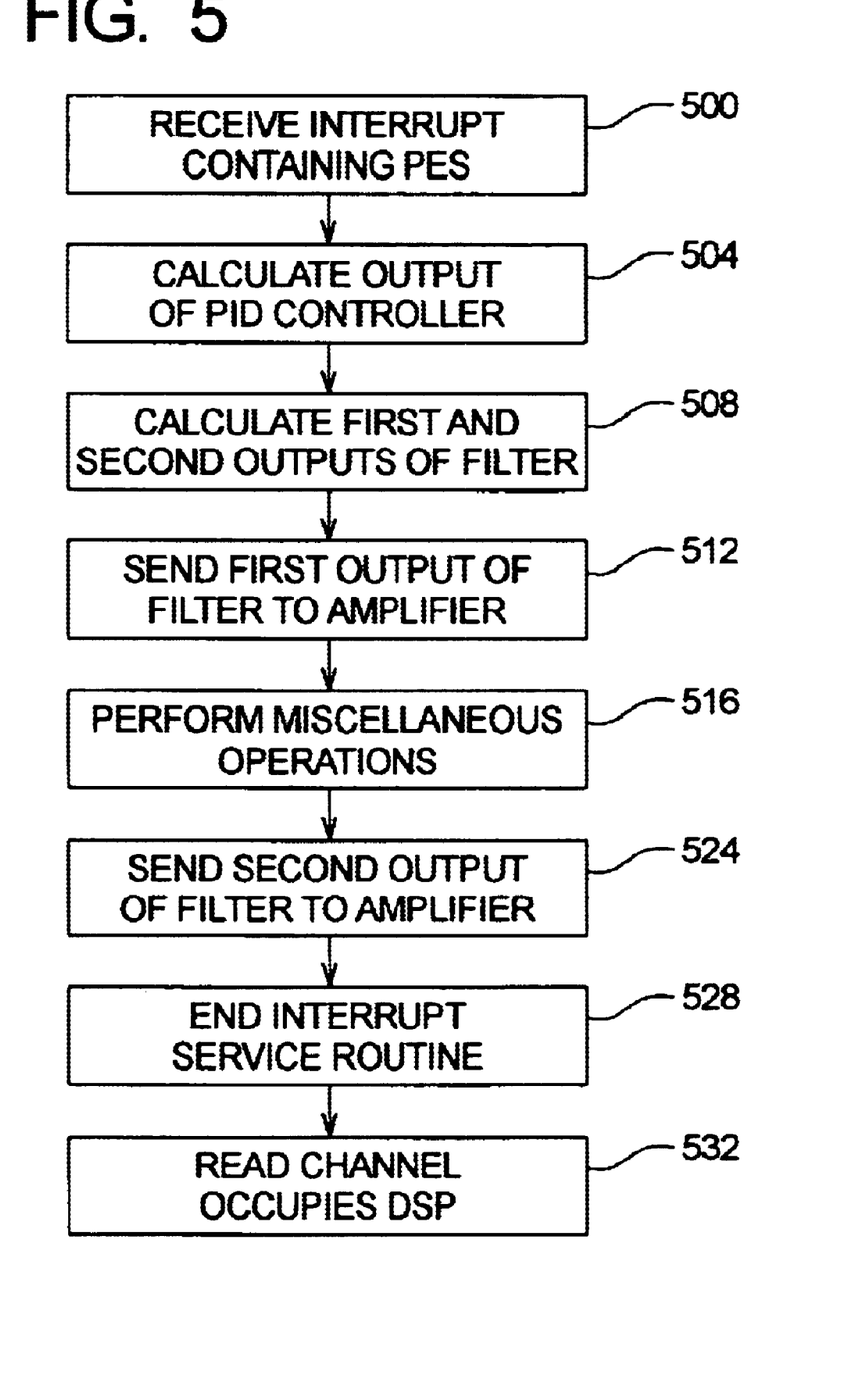
FIG. 5 is a flow chart depicting the operation of a servo control system in accordance with an embodiment of the present invention.

With reference now to FIG. 5, a flow chart describing the operation of a servo control system 300 in accordance with an embodiment of the present invention is illustrated. Initially, at step 500, an interrupt containing a position error signal derived from a servo sector is received at the controller 304. In response, the controller 304 calculates a control output (step 504). The control output is then provided to the filter 308, and the first 336a and second 336b outputs of the filter are calculated (step 508). The step of calculating the first 336a and second 336b filtered outputs may include proportioning the outputs, as will be described in greater detail below. In general, the step of calculating a first output 336a involves calculating an output of the filter 308 for a time corresponding to the time at which the position error signal was read. The step of calculating a second output 336b of the filter 308 generally involves calculating an output 336 of the filter 308 for a time corresponding to the time at which the position error signal 320 was read, plus one half the sampling period. Although the position error signal 320 used to calculate the second filtered output 336b is the same as the position error signal 320 used to calculate the first filtered output 336a, the amplitude of the second filtered output 336b will generally be different from the first filtered output 336a. This is because of the preceding filter algorithm output calculation with respect to the first control output 332, and because of the time for which the second filtered output 336b is calculated is different from the first 336a. The first filtered output 336a is then provided to the amplifier 312 (step 512), and an amplified analog control output 314, as commanded by the filtered output 336, is provided to the actuator 128. This amplified analog control output 314 is provided until the next output 336b of the filter 308 is provided to the amplifier 312.

At step 516, miscellaneous operations are performed. For example, various control related calculations or precalculations may be performed. Next, at step 524, the second output 336b of the filter 308 is provided to the amplifier 312. Upon receipt of the second filtered output 336b, the transconductance amplifier outputs the commanded control value to the actuator 128 until a next filtered output command 336 is received.

At step 528, the interrupt service routine that was initiated upon receipt of the updated position error signal is completed. The controller 132 may then perform other functions. For example, the read channel may occupy the digital signal processor implementing the controller 132 during which time read and write operations may be conducted. Upon receipt of the next updated position error signal, the controller 300 returns to step 500. Therefore, it can be appreciated that for each sampling period, one interrupt service routine is completed, and two control outputs are provided in sequence to the actuator 128.

Figure 6:
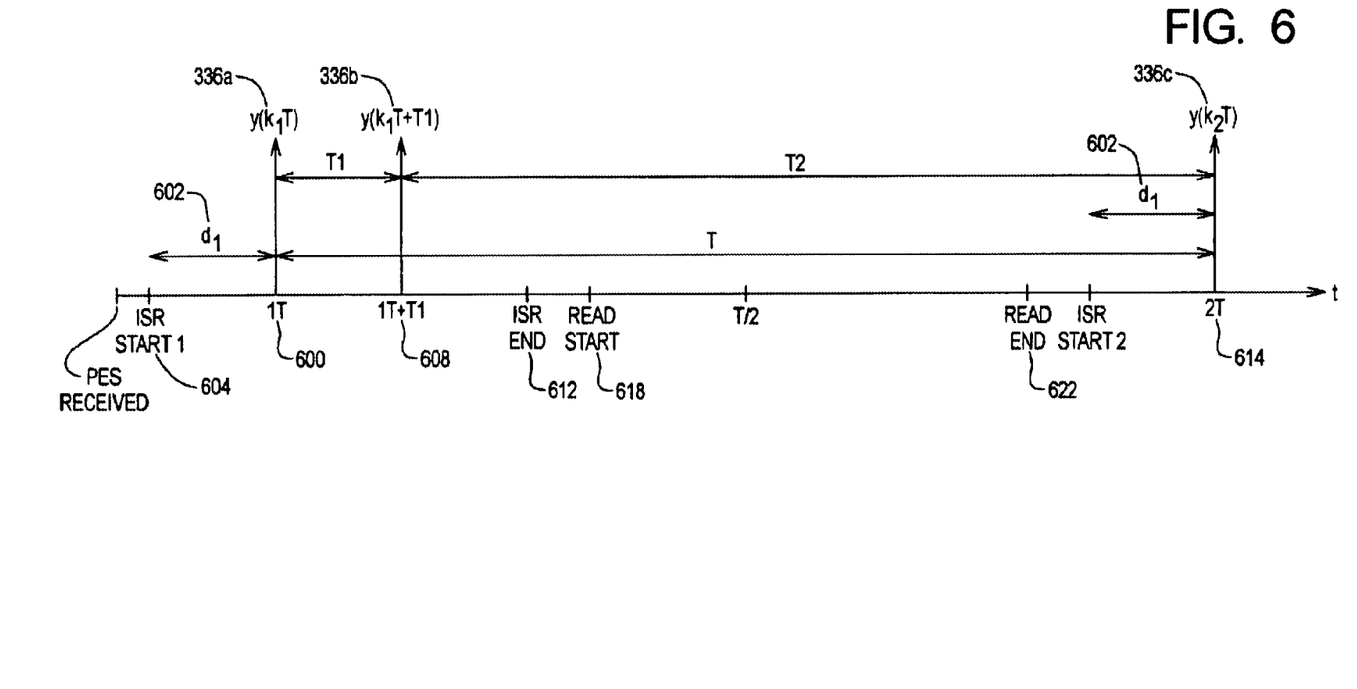
FIG. 6 is a filter time domain plot in accordance with an embodiment of the present invention, the operation of which is depicted in FIG. 5.

With reference now to FIG. 6, a filter time domain plot in accordance with an embodiment of the present invention is illustrated. In particular, FIG. 6 illustrates a filter time domain plot corresponding to an embodiment of the present invention described in connection with FIG. 5. At a time labeled 1T 600, a first filtered output y($k_1$T) 336a is provided to the amplifier 312 for a period of time T1. The first filtered output 336a is delayed by a period of time $d_1$ 602 after the start of the interrupt service routine 604, due to the time required for the controller 304 to generate a control output 332, and the filter 308 to generate a filtered output 336.

At time 1T+T1 608 a second filtered output y($k_1$T+T1) 336b is output to the amplifier 312 for a time period T2. The second filtered output 336b is based on the same position error information received by the servo control system 300 at the start of the interrupt service routine as the first control output. However, because the output of the filter 308 depends, at least in part, on the previous output of the filter 308, the amplitude of the second filtered output 336*b* may differ from the amplitude of the first filtered output 336*a*.

In addition, it will be appreciated that the first and second filtered control outputs 336 are initiated during the same interrupt service routine, and that the time periods T1 and T2 are asymmetric in that they are of unequal length. It will also be appreciated that read operations may be performed by the controller at the time marked "read start" 618 in FIG. 6, and may continue uninterrupted until the time marked "read end" 622. Although FIG. 6 refers to read operations, it will be appreciated that write operations may also be conducted during that time.

From the embodiment illustrated in connection with FIGS. 5 and 6, it can be appreciated that the first filtered output y($k_1$T) 336*a* initiated at time 1T 600 depends on positioning information received at the start of the interrupt service routine 604. Therefore, the delay $d_1$ 602 represents an amount of time required for the controller 132 to calculate the first filtered output y($k_1$T) 336*a*. In addition, it will be appreciated that the second filtered output y($k_1$T+T1) 336*b*, which is output beginning at time 1T+T1 continues to be output until the next filtered output y($k_2$T) 336*c* is output at time 2T 614. Therefore, it can be appreciated that the delay $d_1$ 602 during which time the next first filtered control output y($k_2$T) 336*c* is calculated is not a time during which no control signal is provided by the servo control system 300. Instead, the second filtered control output y($k_1$T+T1) 336*b* continues to be provided until the next filtered output y($k_2$T) 336*c* is initiated during the next interrupt service routine, which commences at the point labeled ISR START 2 626 in FIG. 6.

Figure 7:
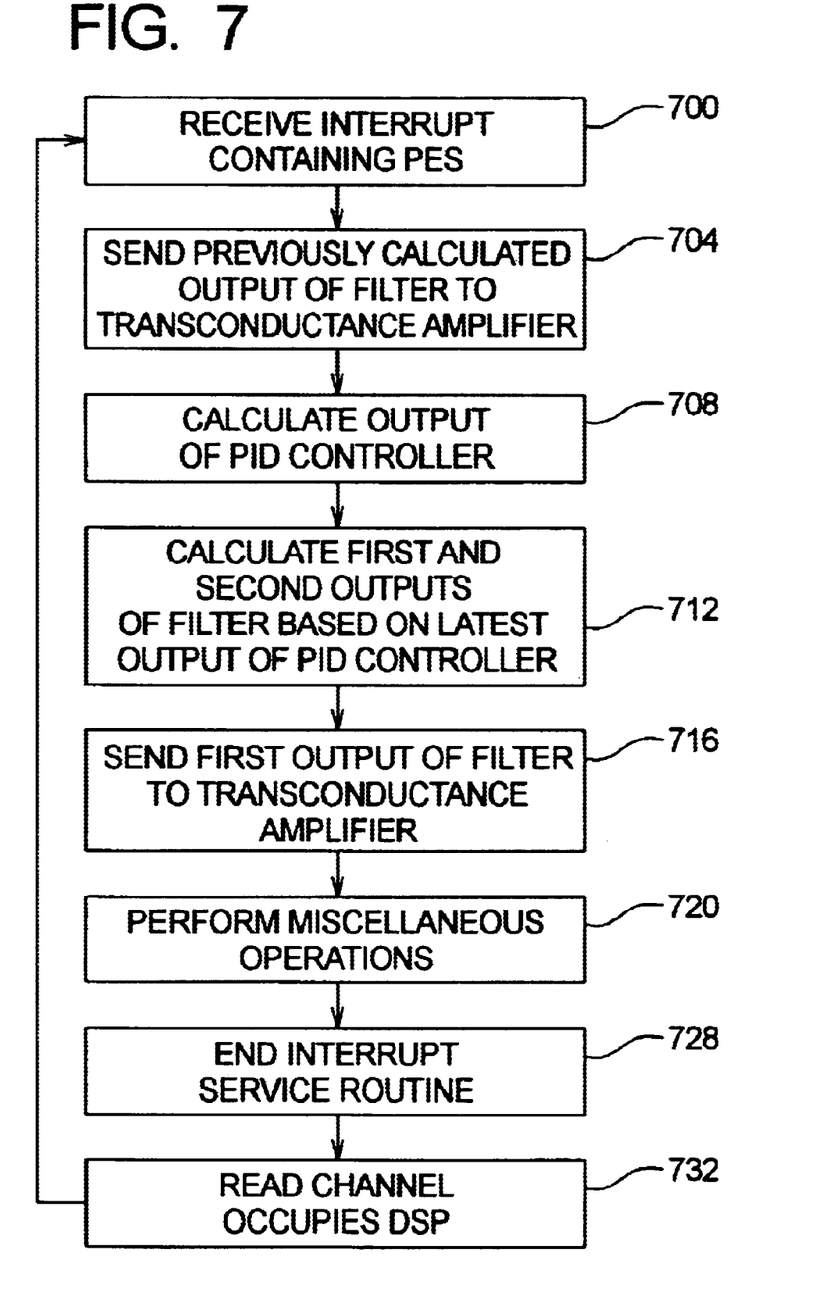
FIG. 7 is a flow chart depicting the operation of a servo control system in accordance with another embodiment of the present invention.

With reference now to FIG. 7, a flow chart depicting the operation of yet another embodiment of the present invention is illustrated. Initially, at step 700, an interrupt containing a position error signal is received. Accordingly, an interrupt service routine is initiated at step 700. Next, a previously calculated filtered output 336*c* is provided to the transconductance amplifier 312 (step 704). At step 708, the output 332 of the controller 304 in response to the position error signal received at step 700 is determined. The outputs 336*a* and 336*b* of the filter 308 for the latest output 332 of the controller 304 are next calculated at step 712. The step of calculating the outputs 336*a* and 336*b* (step 708) may include proportioning at least one of the outputs 336*a* or 336*b*.

At step 716, the first output 336*a* of the oversampling filter 308 is provided to the amplifier 312. At step 720, miscellaneous operations, such as control related calculations or precalculations, may be performed. Following completion any miscellaneous operations, the second output 336*b* of the oversampling filter 308, which will be output at the beginning of the next interrupt service routine, is calculated (step 724). The interrupt service routine then ends (step 728) and the read/write channel is allowed to occupy the digital signal processor (step 732). Upon the receipt of a next interrupt, the system returns to step 700.

Figure 8:
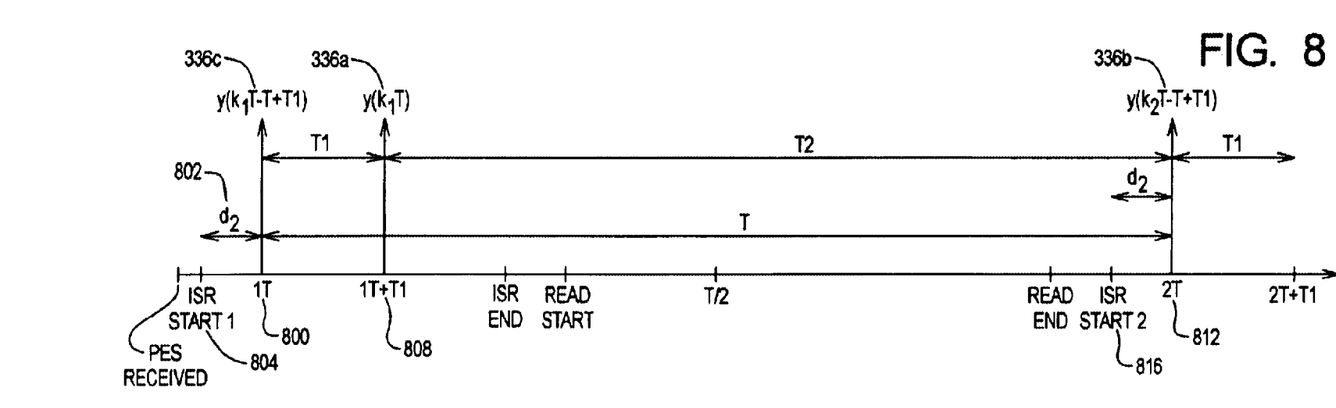
FIG. 8 is a filter time domain plot in accordance with another embodiment of the present invention, the operation of which is depicted in FIG. 7.

With reference now to FIG. 8, a filter time domain plot in accordance with an embodiment of the present invention, the operation of which is also described in connection with FIG. 7, is illustrated. At time I T 800, the previously calculated control output y($k_1$T−T+T1) 336*c* is provided by the oversampling filter 308 to the amplifier 312 at time 1T 800. It will be noted that the period of delay $d_2$ 802 between the start of the interrupt service routine 804 and time T1 800 is less than the delay $d_1$ 602 in the example given above in connection with FIGS. 5 and 6. This is because in the embodiment described in connection with FIGS. 7 and 8 the amplitude of the control output 336*c* initially provided during an interrupt service routine is calculated during the preceding interrupt service routine. Because of this precalculation, the delay $d_2$ 802 is relatively short. At time 1T+T1 808, the first control output y($k_1$T) 336*a* calculated during the interrupt service routine beginning at the point marked ISR START 1 804 is initiated. This next control output y($k_1$T) 336*a* continues to be provided by the filter 308 to the amplifier 312 until the second control output y($k_2$T−T+T1) 336*b* calculated during the sampling period beginning at the point marked ISR START 1 804 is provided at time 2T 812 during the next interrupt service routine. The second interrupt service routine commences at the point labeled ISR START 2 816 in FIG. 8.

From the above description, it can be appreciated that the output y($k_1$T−T+T1) 336*c* and the output y($k_1$T) 336*a* are provided by the filter 308 for different periods (T1 and T2) of time. However, it is also apparent that the sum of the time periods T1 and T2 is equal to the sampling period T. Because of the sample and hold function provided by the filter 308, the second control output y($k_1$T) 336*b* continues to be provided, even after start of the next interrupt service routine. Similarly, it can be appreciated that the output y($k_1$T) 336*a* and the output y($k_2$T−T+T1) are provided by the filter 308 for different (T2 and T1) periods of time.

As discussed above, the present invention provides a plurality (e.g., two) filtered outputs 336 for each sampling period that are active for unequal periods of time. More particularly, a first filtered output 336*a* may be provided for a time T1 and a second filtered output may be provided for a time T2, where T1+T2 is about equal to the sampling period T, and where T1≠T2≠T/2. However, the first filter algorithm output 404*a* may, for a particular control output 332, be calculated for time kT, while the second filter algorithm output 404*b* may be calculated for time kT+T/2 for that same control output 332. That is, the output of the filter algorithm 400 may be calculated as if the filtered outputs 336 are each provided to the amplifier 312 for a period of time about equal to T/2.

The inventors of the present invention have recognized that the filter characteristics of a servo control system 300 in accordance with the present invention are improved if the filtered control output 336 is proportioned so that the total control energy provided by the filtered control outputs 336 calculated for a single sampling period is equal to the total energy that would be provided to the amplifier 312 if T1=T2=T/2. Either or both of the first 336*a* or the second 336*b* filtered control outputs generated in connection with a single sampling period may be proportioned. For example, the first proportioned filtered control output y'(kT) 336*a* may be proportioned such that y'(kT)=y(kT+T/2)+(y(kT)−y(kT+T/2))*((T/2)/T1), where T is equal to the first sampling period, y(kT+T/2) is a second filtered algorithm output 404*a*, y(kT) is a first filter algorithm output 404*a*, and T1 is an output period of the first control command.

As a further example, in accordance with another embodiment of the present invention, the second filtered control output 336*b* may be proportioned. According to this embodiment, the proportioned second filtered control output y'(kT+T1)=y(kT)+(y(kT+T/2)−y(kT))*((T/2)/T2), where T is equal to the first sampling period, y(kT) is a first filtered algorithm output, y(kT+T/2) is a second filter algorithm output, and T2 is an output period of the second filtered control command.

In connection with the embodiments of the present invention described above, it can be appreciated that the present invention provides an oversampled control output 314 to the actuator 128. In addition, it can be appreciated that the servo system 300 of the present invention provides asymmetric outputs 314, in that the first and second outputs 314 initiated during a single sampling period are output for unequal periods of time. Furthermore, it can be appreciated that the outputs 314 are initiated during a single interrupt service routine performed for each sampling period. Accordingly, the present invention provides relatively long periods during which the controller 132 resources are available for handling other functions, such as read and write operations.

Figure 9:
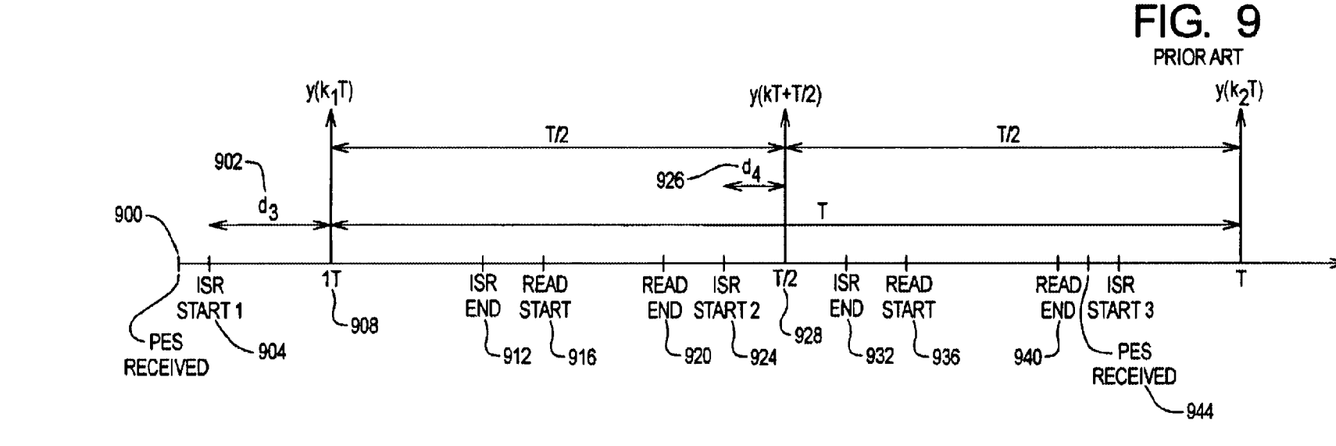
FIG. 9 is a filter time domain plot in accordance with the prior art.

With reference now to FIG. 9, a filter time domain plot in accordance with a prior art oversampling filter is illustrated, for purposes of better appreciating the differences between the present invention and the prior art. As shown in FIG. 9, a position error signal from a servo sector 900 is received, and a first interrupt service routine initiated 904. Following a period of delay $d_3$ 902, during which time an output of the prior art control system is calculated, a first control output $y(k_1T)$ is provided at time 1T 908. Next, the first interrupt service routine ends 912 and read and write operations may begin 916. After a relatively short period of time devoted to read and write operations, those operations end 920 and a second interrupt service routine starts 924. It will be noted that the start of the second interrupt service routine 924 does not correspond to the receipt of additional position error signal data. Accordingly, the second interrupt service routine is performed during the same sampling period as the first interrupt service routine. After a second period of delay $d_4$ 926, a second output $y(kT+T/2)$ is provided at time T/2 928. The second interrupt service routine then ends 932, and additional read and write operations may begin 936. After a relatively short period, the read and write operations are terminated 940 and position error signal data received in connection with a next servo sector is received 944, to define the beginning of the next sampling period.

With continued reference to FIG. 9, it will be appreciated that the first $y(kT)$ and second $y(kT+T/2)$ outputs initiated during a single sampling period according to the prior art servo control system are provided for equal periods of time. Accordingly, the prior art system is symmetrical. In addition, it can be appreciated that the prior art requires that two interrupt service routines be completed during a single sampling period. This results in additional overhead in the controller 132, and a corresponding reduction in processing time available on the controller 132 for performing read and write operations.

Figure 10A:
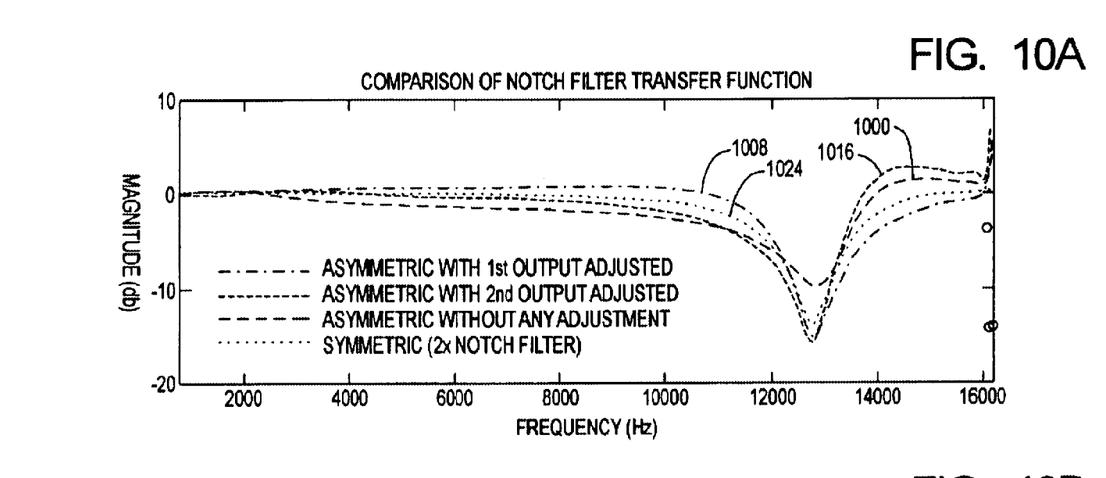
FIG. 10A depicts the signal attenuation of different servo sector control systems at various frequencies.
Figure 10B:
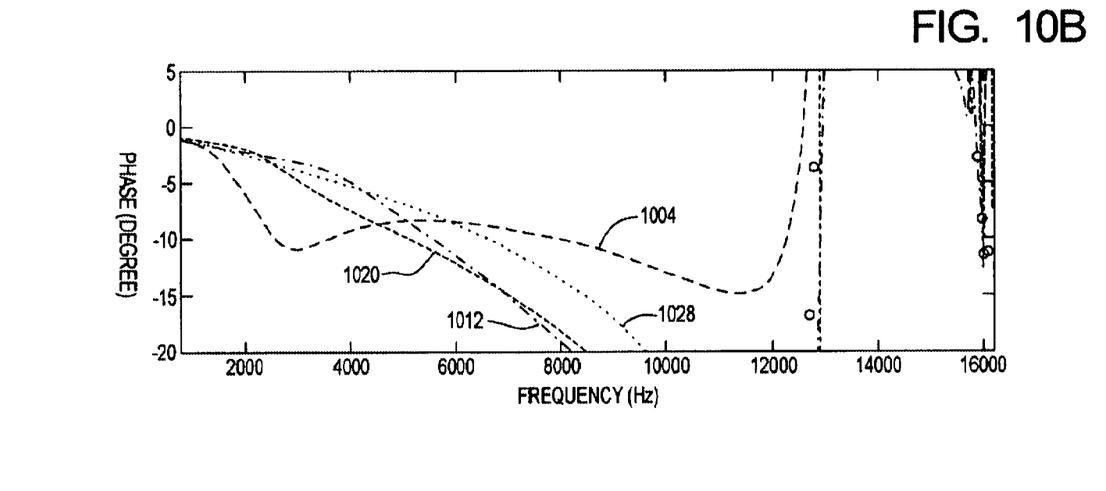
FIG. 10B depicts the phase delay of different servo control systems at various frequencies.

With reference now to FIGS. 10A and 10B, the performance of servo control systems 300 in accordance with the present invention are compared to the performance of oversampling servo control system in accordance with the prior art. In particular, FIG. 10A compares the signal attenuation at various frequencies of the systems, while FIG. 10B compares the signal phase shift at various frequencies for the systems. In FIGS. 10A and 10B, the performance of a servo control system 300 having asymmetric oversampling notch filter in accordance with the present invention is illustrated by traces 1000 and 1004. The performance of a servo control system 300 having an asymmetric oversampling notch filter and in which the first output 336a initiated during an interrupt service routine is proportioned in accordance with an embodiment of the present invention is illustrated by traces 1008 and 1012. The performance of a servo control system 300 having an asymmetric oversampling notch filter and in which the second output 336b initiated during an interrupt service routine is proportioned is illustrated by traces 1016 and 1020. Finally, the performance of a servo control system having an oversampled filter providing symmetrical outputs in accordance with the prior art is illustrated by traces 1024 and 1028. From a review of FIGS. 10A and 10B, it is apparent that proportioning one of the outputs 336a (see, e.g. traces 1008 and 1016) improves the attenuation characteristics of the servo control system 300. Furthermore, it is apparent that proportioning one of the outputs also improves the phase shift performance of asymmetric oversampling filter (compare traces 1012 and 1020 to 1004) (see trace 1004). In addition, as described above, the performance characteristics of the servo control systems 300 in accordance with various embodiments of the present invention require only a single interrupt service routine in order to initiate multiple outputs during an interrupt service routine. Therefore, the present invention is unlike the prior art system, which requires an interrupt service routine for each control output.

The asymmetric filtered control outputs 336 of the present invention allow a servo control system 300 to be implemented with high track 136 seeking and following performance, while requiring relatively few controller 132 resources. In particular, the present invention provides a servo control system 300 having an oversampling filter 308 that is capable of initiating multiple control outputs 314 to an actuator 128 during a single interrupt service routine. This capability is enabled by the use of asymmetric filtered control outputs 314, which allows interrupt services routines that occupy less than one-half a sampling period. In addition, the present invention provides for proportioning the energy provided to the actuator 128 to improve the filter characteristics, including the cutoff frequency or frequencies and phase shift performance of the servo control system 300.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for providing a variable rate oversampling digital filter for resonance compensation in a disk drive, comprising:

receiving first position information;

in response to said first position information, generating a first control command;

filtering said first control command;

outputting a first plurality of filtered control commands, wherein said outputting includes outputting at least a first filtered control command during a first length of time and outputting a second filtered control command during a second length of time; and receiving second position information, wherein a time between said first and second position information defines a first sampling period, wherein said first plurality of filtered control commands are output substantially during said first sampling period, and wherein said first length of time does not substantially equal said second length of time.

2. The method of claim 1, wherein said step of outputting said first filtered control command is performed prior to said step of receiving said second position information, and wherein said step of outputting said second filtered control command is performed after said step of receiving said second position information.

3. The method of claim 1, wherein said step of generating comprises generating first and second control commands, and wherein said step of filtering comprises filtering said first and second control commands.

4. The method of claim 1, further comprising outputting a third filtered control command after said step of receiving second position information.

5. The method of claim 1, wherein first and second control commands are generated in response to receiving said first position information.

6. The method of claim 1, wherein a first control command is generated in response to receiving said first position information, and wherein said first and second filtered output commands are generated from said first control command.

7. The method of claim 1, wherein said step of filtering comprises digitally processing said first control command to remove at least a first selected frequency.

8. The method of claim 1, further comprising generating a first interrupt, wherein said steps of outputting said first and second filtered control outputs are initiated during a period of said first interrupt.

9. A method for providing a variable rate oversampling digital filter for resonance compensation in a disk drive, comprising:
   receiving first position information;
   in response to said first position information, generating a first control command;
   filtering said first control command;
   outputting a first filtered control command;
   outputting a second filtered control command;
   receiving second position information, wherein a time between said first and second position information defines a first sampling period, and wherein a time between said step of outputting said first filtered control command and said step of outputting said second filtered control command does not equal one-half of said first sampling period;
   outputting a third filtered control command after said step of receiving second position information; and
   wherein a product of an output level of said first control command and one half said first sampling period plus a product of an output level of said second control command and one half said first sampling period equals a first amount, said method further comprising:
      proportioning one of said first and second filtered control commands, wherein said time between said step of outputting said first filtered control command and said step of outputting said second filtered control command defines a first output period, wherein a time between said step of outputting said second filtered control command and said third filtered control command defines a second output period, wherein a product of an output level of said first control command and said first output period plus a product of an output level of said first control command and said second output period is equal to said first amount.

10. A method for providing a variable rate oversampling digital filter for resonance compensation in a disk drive, comprising:
   receiving first position information;
   in response to said first position information, generating a first control command;
   filtering said first control command;
   outputting a first filtered control command;
   outputting a second filtered control command;
   receiving second position information, wherein a time between said first and second position information defines a first sampling period, and wherein a time between said step of outputting said first filtered control command and said step of outputting said second filtered control command does not equal one-half of said first sampling period; and
   proportioning an output of said first filtered control command, wherein said proportioned output of said first filtered control command $y'(kT)$ is given by the expression $y'(kT)=y(kT+T/2)+(y(kT)-y(kT+T/2))*((T/2)/T1)$, wherein T is equal to said first sampling period, wherein $y(kT+T/2)$ is an output of said second filtered control command, wherein $y(kT)$ is an output of said first filtered control command and wherein T1 is an output period of said first control command.

11. A method for providing a variable rate oversampling digital filter for resonance compensation in a disk drive, comprising:
   receiving first position information;
   in response to said first position information, generating a first control command;
   filtering said first control command;
   outputting a first filtered control command;
   outputting a second filtered control command;
   receiving second position information, wherein a time between said first and second position information defines a first sampling period, and wherein a time between said step of outputting said first filtered control command and said step of outputting said second filtered control command does not equal one-half of said first sampling period; and
   proportioning an output of said second filtered control command, wherein said proportioned output of said second filtered control command $y'(kT+T1)$ is given by the expression $y'(kT+T1)=y(kT)+(y(kT+T/2)-y(kT))*((T/2)/T2)$, wherein T is equal to said first sampling period, wherein $y(kT)$ is an output of said first filtered control command, wherein $y(kT+T/2)$ is an output of said second filtered control command and wherein T2 is an output period of said second control command.

12. A method for filtering control values in a hard disk drive, comprising:
   receiving a position command at a controller at a first rate, wherein said first rate defines a first period;
   for each of a plurality of position commands received at said controller, generating an unfiltered control command in said controller;
   receiving said unfiltered control command at a filter;
   generating a first filtered control command in said filter for said position command received at said controller;
   after said step of generating a first filtered control command, generating a second filtered control command in said filter for said position command received at said controller;

outputting said first filtered control command for a first length of time; and outputting said second filtered control command for a second length of time, wherein said first length of time is not equal to said second length of time, and wherein a sum of said first length of time and said second length of time is approximately equal to said first period.

13. The method of claim 12, further comprising:

proportioning one of said first filtered control command and said second filtered control command, wherein an amount of energy outputted during said step of outputting said first filtered control command for a first length of time plus an amount of energy outputted during said step of outputting said second filtered control command for a second length of time is equal to a sum of energy that would be outputted if said first length of time were equal to said second length of time.

14. The method of claim 12, further comprising:

proportioning said first filtered control command, wherein said proportioned output of said first filtered control command is equal to said second filtered control command plus a quantity equal to a difference obtained by subtracting said second filtered control command from said first filtered control command, said difference multiplied by a quantity equal to said first period divided by two times said first length of time.

15. The method of claim 12, further comprising:

proportioning said second filtered control command, wherein said proportioned output of said second filtered control command is equal to said first filtered control command plus a quantity equal to a difference obtained by subtracting said first filtered control command from said second filtered control command, said difference multiplied by a quantity equal to said first period divided by two times said second length of time.

16. The method of claim 12, wherein said steps of generating at least a first control command and generating said first and second filtered control commands are performed in a processor.

17. The method of claim 12, further comprising:

providing said first and second filtered control commands to a digital to analog converter to obtain at least first and second analog control commands; and providing said analog control commands to an actuator.

18. A method for providing an oversampled control output signal in a hard disk drive, comprising:

receiving a first positioning signal, wherein a time between receiving said first positioning signal and receiving a second positioning signal defines a sampling period;

filtering said first positioning signal, wherein said step of filtering said first positioning signal comprises:
calculating a first control output;
calculating a second control output;

proportioning said first control output to obtain a proportioned first control output;

outputting said first proportioned control output for a first time period, wherein said first time period does not equal one-half of said sampling period;

outputting said second control output for a second time period, wherein said second time period is not equal to one-half of said sampling period, wherein a product of said first proportioned control output and said first period of time plus a product of said second control output and said second period of time is equal to a product of said first control output and one half said sampling period plus a product of said second control output and one half said sampling period.

19. The method of claim 18, wherein said step of calculating a first control output comprises passing said first positioning signal through a digital filter, and wherein said step of calculating a second control output comprises passing said first positioning signal through said digital filter after said step of calculating a first control output.

20. The method of claim 19, wherein said digital filter comprises an impulse response filter.

21. The method of claim 18, wherein said step of calculating a first control output comprises passing a first instance of said first positioning signal through a digital filter, and wherein said step of calculating a second control output comprises passing a second instance of said first positioning signal through said digital filter.

22. The method of claim 18, wherein said step of outputting said proportioned first control output is initiated prior to receiving said second positioning signal, and wherein said step of outputting said second control output is performed subsequent to receiving said second positioning signal.

23. The method of claim 18, further comprising:

generating an interrupt and initiating a first interrupt service routine in response to receiving said first positioning signal, wherein said step of outputting said proportioned first control output and said step of outputting said second control output are initiated during said first interrupt service routine.

24. The method of claim 18, further comprising:

generating an interrupt and initiating a first interrupt service routine in response to receiving said first positioning signal, wherein said steps of calculating first and second control outputs are performed during said first interrupt service routine.

25. A method for providing an oversampled control output signal in a hard disk drive, comprising:

receiving a first positioning signal, wherein a time between receiving said first positioning signal and receiving a second positioning signal defines a sampling period;

filtering said first positioning signal, wherein said step of filtering said first positioning signal comprises:
calculating a first control output;
calculating a second control output;

outputting said first control output for a first time period, wherein said first time period does not equal one-half of said sampling period;

proportioning said second control output to obtain a second proportioned control output; and outputting said second control output for a second time period, wherein said second time period is not equal to one-half of said sampling period, wherein a product of said first control output and said first period of time plus a product of said second proportioned control output and said second period of time is equal to a product of said first control output and one half said sampling period plus a product of said second control output and one half said sampling period.

26. The method of claim 25, wherein said step of calculating a first control output comprises passing said first positioning signal through a digital filter, and wherein said step of calculating a second control output comprises passing said first positioning signal through said digital filter after said step of calculating a first control output.

27. The method of claim 26, wherein said digital filter comprises an impulse response filter.

28. The method of claim 25, wherein said step of calculating a first control output comprises passing a first instance of said first positioning signal through a digital filter, and wherein said step of calculating a second control output comprises passing a second instance of said first positioning signal through said digital filter.

29. The method of claim 25, wherein said steps of outputting said first control output and of outputting said second proportioned control output are initiated prior to receiving said second positioning signal.

30. The method of claim 25, further comprising:
generating an interrupt and initiating a first interrupt service routine in response to receiving said second positioning signal, wherein said step of outputting said first control output and said step of outputting said proportioned second control output are initiated during said first interrupt service routine.

31. The method of claim 25, further comprising:
generating an interrupt and initiating a first interrupt service routine in response to receiving said first positioning signal, wherein said steps of calculating said first and second control outputs are performed during said first interrupt service routine.

32. A variable rate oversampling digital filter for resonance compensation in a hard disk drive apparatus, comprising:
a controller;
a filter;
a first magnetic storage disk, comprising a plurality of servo sectors;
a first actuator arm;
an actuator for positioning said first actuator arm with respect to said first magnetic storage disk;
a first transducer head mounted to a first end of said actuator arm; and
a spindle motor for rotating said first magnetic storage disk relative to said first transducer head, wherein position data read from said plurality of servo sectors by said first transducer head is received at said controller at a first rate to define a first period, wherein a portion of said first period comprises an interrupt service routine period, wherein during said interrupt service routine period a plurality of filtered transducer arm control outputs are initiated in response to said position data contained in one of said servo sectors, wherein each of said plurality of filtered transducer arm control outputs defines a length of time, during which it is output, and when at least two of said lengths of time are not substantially equal to each other.

33. The apparatus of claim 32, wherein two transducer arm control outputs are initiated and are provided to said actuator in response to said position data contained in said one of said servo sectors during said interrupt service routine period.

34. The apparatus of claim 32, wherein a single interrupt service routine occurs during each instance of said first period.

35. The apparatus of claim 32, wherein said controller provides said filter with a plurality of control outputs in response to said position data contained in one of said servo sectors.

36. The apparatus of claim 32, wherein said controller provides said filter with one control output in response to said position data contained in one of said servo sectors, and wherein said filter provides said actuator with a plurality of filtered control outputs for each control output received from said controller.

37. The apparatus of claim 32, further comprising a processor, wherein at least one of said controller and said filter are implemented by said processor.

38. The apparatus of claim 32, wherein a first of said plurality of control outputs is provided to said actuator for a first period of time, wherein a second of said plurality of control outputs is provided to said actuator for a second period of time, and wherein said first period of time is not equal to said second period of time.

39. The apparatus of claim 32, wherein a time between a first of said plurality of control outputs and said second plurality of control outputs is not equal to one-half said first period of time.

40. The apparatus of claim 32, wherein said filter comprises a digital filter.

41. The apparatus of claim 32, wherein said filter comprises at least one of a notch filter and a low pass filter.

42. The apparatus of claim 32, wherein said filter comprises a multiple order impulse response filter.

43. The apparatus of claim 32, wherein a first of said plurality of control outputs does not equal a second of said plurality of outputs.

44. A variable rate oversampling digital filter for resonance compensation in a hard disk drive apparatus, comprising:
a controller;
a filter;
a first magnetic storage disk, comprising a plurality of servo sectors;
a first actuator arm;
an actuator for positioning said first actuator arm with respect to said first magnetic storage disk;
a first transducer head mounted to a first end of said actuator arm;
a spindle motor for rotating said first magnetic storage disk relative to said first transducer head, wherein position data read from said plurality of servo sectors by said first transducer head is received at said controller at a first rate to define a first period, wherein a portion of said first period comprises an interrupt service routine period, wherein during said interrupt service routine period a plurality of filtered transducer arm control outputs are initiated in response to said position data contained in one of said servo sectors; and
wherein an output of a first filtered control command $y'(kT)$ is proportioned according to the expression $y'(kT)=y(kT+T/2)+(y(kT)-y(kT+T/2))*(T/2)/T1)$, wherein T is equal to said first period, wherein $y(kT+T/2)$ is an output of a second filtered control command, wherein $y(kT)$ is an output of said first filtered control command prior to said step of proportioning, and wherein T1 is an output period of said first control command.

45. A variable rate oversampling digital filter for resonance compensation in a hard disk drive apparatus, comprising:
a controller;
a filter;
a first magnetic storage disk, comprising a plurality of servo sectors;
a first actuator arm;
an actuator for positioning said first actuator arm with respect to said first magnetic storage disk;

a first transducer head mounted to a first end of said actuator arm;

a spindle motor for rotating said first magnetic storage disk relative to said first transducer head, wherein position data read from said plurality of servo sectors by said first transducer head is received at said controller at a first rate to define a first period, wherein a portion of said first period comprises an interrupt service routine period, wherein during said interrupt service routine period a plurality of filtered transducer arm control outputs are initiated in response to said position data contained in a one of said servo sectors; and wherein an output of a second filtered control command $y'(kT+T1)$ is proportioned according to the expression $y'(kT+T1)=y(kT)+(y(kT+T/2)-y(kT))*(T/2)/T2)$, wherein T is equal to said first period, wherein $y(kT)$ is an output of a first filtered control command, wherein $y(kT+T/2)$ is an output of said second filtered control command prior to said step of proportioning, and wherein T2 is an output period of said second control command.

* * * * *